Patented Apr. 13, 1926.

1,581,031

UNITED STATES PATENT OFFICE.

STANLEY COCHRAN SMITH, OF LONDON, ENGLAND, ASSIGNOR OF ONE-HALF TO FRANK EDWARD ELMORE, OF THREE FIELDS, ENGLAND.

PROCESS OF MAKING LEAD SULPHATE.

No Drawing. Application filed October 12, 1925. Serial No. 62,126.

*To all whom it may concern:*

Be it known that I, STANLEY COCHRAN SMITH, a subject of the King of Great Britain, residing in London, England, have invented certain new and useful Processes of Making Lead Sulphate, of which the following is a specification.

Sulphate of lead being soluble in solutions of alkali chlorides, alkaline earth chlorides, ammonium chloride, and the chlorides of iron, aluminium and many other metals, the conversion of lead chlorides into lead sulphate by double decomposition between lead chloride and a sulphate of one of these metals is impracticable. It has been recommended that crystals of lead chloride or a solution of lead chloride should be treated with zinc sulphate to precipitate the lead as sulphate, leaving the zinc in solution as chloride. This reaction, however, is incomplete in the sense that much lead is liable to remain in the zinc chloride solution and that the lead sulphate contains chloride, unless certain conditions are observed.

I have found that lead sulphate is substantially insoluble in solutions of zinc chloride containing more than about 20 per cent of zinc chloride and further that lead chloride in suitable form in a state of suspension undergoes double decomposition with zinc sulphate in such a way as to give a pure or practically pure neutral sulphate of lead and a solution of zinc chloride free from lead.

Thus, if lead chloride in a fine state of subdivision (such as the state in which it is precipitated by pouring a hot solution of lead chloride in brine into a large excess of cold water, or the state in which it is separated by decomposing with water certain double salts of lead chloride, such as a double salt of lead and ammonium chlorides or the double salt of lead and magnesium chlorides) is suspended in a solution containing zinc sulphate chemically equivalent to the lead chloride and water in such proportion that the solution of zinc chloride formed will exceed 20 per cent strength, substantially the whole of the lead will remain undissolved in the form of lead sulphate; the change may be hastened by heating or agitation or both, or by grinding the lead chloride with the solution of zinc sulphate.

The invention is not limited to the use of the lead chloride and zinc sulphate in chemically equivalent proportions.

In some cases it is desirable to strengthen an existing solution of zinc chloride; this may be done by suspending a suitable form of lead chloride in the liquor and adding the necessary proportion of zinc sulphate and heating if desirable.

The following examples illustrate the invention, the parts being by weight:—

*Example 1.*—278 parts of lead chloride prepared by precipitation from brine as above described are suspended in a solution of 161 parts of zinc sulphate ($ZnSO_4$) in 500 parts of water, the temperature of the solution being 90°–100° C. The suspension is kept in thorough agitation for 4 hours. The lead sulphate and solution of zinc chloride thus formed are separated in any convenient manner.

The solution of zinc chloride may be heated with sulphuric acid so as to obtain a solution of zinc sulphate for use in converting a further batch of lead chloride into sulphate, and also hydrochloric acid as a distillate for any useful purpose.

In the systematic working of the process the liquor separated from the lead sulphate may be used repeatedly in the conversion of fresh batches of lead chloride, portions being withdrawn at intervals for recovery of the constituents and water containing zinc sulphate being added to take the place of the portion withdrawn. The following example illustrates this mode of working.

*Example 2.*—Lead chloride and zinc sulphate in equivalent proportions are stirred at a convenient temperature with such a quantity of water as is sufficient to dissolve the whole of either of the components of the solid phase, the temperature of the mixture being near the boiling point. When analysis of the solution shows that its content of chlorine-ion has become constant, the liquor is separated from the solids and is divided into two portions, each of known weight. One of these portions (hereinafter referred to as the "nucleus liquor") is used in the treatment of another batch of chloride of lead, while the other (the "residual liquor") is withdrawn for recovery of its constituents, such as by treatment with sulphuric acid as explained above. To the nucleus liquor is added (1) a quantity of water equal to that contained in the residual liquor; (2) a quantity of lead chloride equivalent to the zinc chloride contained in the residual liquor; and (3) a quantity of zinc sulphate equivalent to the zinc chloride in the residual liquor.

The mixture is now stirred under the same conditions as before; the solids, which should now be substantially pure lead sulphate, are separated from the liquor; the latter is divided into nucleus liquor and residual liquor, and the sequence of operations is repeated as often as desired.

The present invention is applicable to processes of recovering lead from ores, concentrates, residues or the like in which the lead is obtained in the form of lead chloride, particularly processes in which zinc chloride is used for chloridizing lead-zinc sulphide ores.

*Example 3.*—A lead-zinc sulphide ore is heated, according to a well-known process, with zinc chloride so as to convert the lead into chloride and the added zinc into zinc sulphide. The melt is leached with hot brine containing a little acid whereby the lead chloride is dissolved and a residue containing zinc sulphide remains undissolved. The solution of lead chloride is poured into plenty of cold water to precipitate the lead chloride. The residue is subjected to a sulphatizing roast producing zinc sulphate which is leached out with water or a weak solution of sulphuric acid. The solution of zinc sulphate separated from the undissolved gangue is used as described above for obtaining lead sulphate and zinc chloride, the latter in the form of a strong solution which may be used for working up a further batch of ore.

It is not necessary that the zinc sulphate should be in a dissolved state in applying this invention.

*Example 4.*—Lead chloride is mixed with an equivalent quantity of crystallized zinc sulphate, or a quantity slightly in excess of this, and the mixture is heated to a temperature about 300°–400° C. for 30 minutes. The mass is then treated while hot and by the counter-current system, with a quantity of water sufficient to dissolve the zinc chloride to form a solution containing more than about 20 per cent of zinc chloride, whereby lead sulphate and a solution of zinc chloride are obtained. Or the mass may be allowed to cool, broken up and treated with water as described above.

Zinc chloride solution obtained in any of the manners herein described is liable to contain a trace of lead; this may be removed if necessary by treating the solution with metallic zinc, thereby precipitating metallic lead.

Having thus fully described the nature of the said invention and the best means I know of carrying the same into practical effect, I claim:—

1. A process of converting lead chloride into lead sulphate which consists in causing the chloride to react with zinc sulphate to produce lead sulphate and zinc chloride and removing the lead sulphate from a solution of the zinc chloride which contains more than about 20 per cent of zinc chloride.

2. A process as referred to in claim 1, wherein solid zinc sulphate and solid lead chloride are heated together with insufficient aqueous liquid to dissolve the same to produce the lead sulphate.

3. A process of converting lead chloride into lead sulphate which consists in agitating the chloride with water and zinc sulphate, the proportion of water to zinc sulphate being such that the solution of zinc chloride produced contains more than about 20 per cent of zinc chloride, and then separating the solid matter from the solution.

4. A process as covered in claim 3, conducted at a temperature about the boiling point.

5. A process as covered in claim 3, accompanied by grinding of the lead chloride with the solution of zinc sulphate.

In testimony whereof I have signed my name to this specification.

STANLEY COCHRAN SMITH.